(No Model.)
J. HOWELL.
SIDE BAR CARRIAGE.
No. 246,510. Patented Aug. 30, 1881.
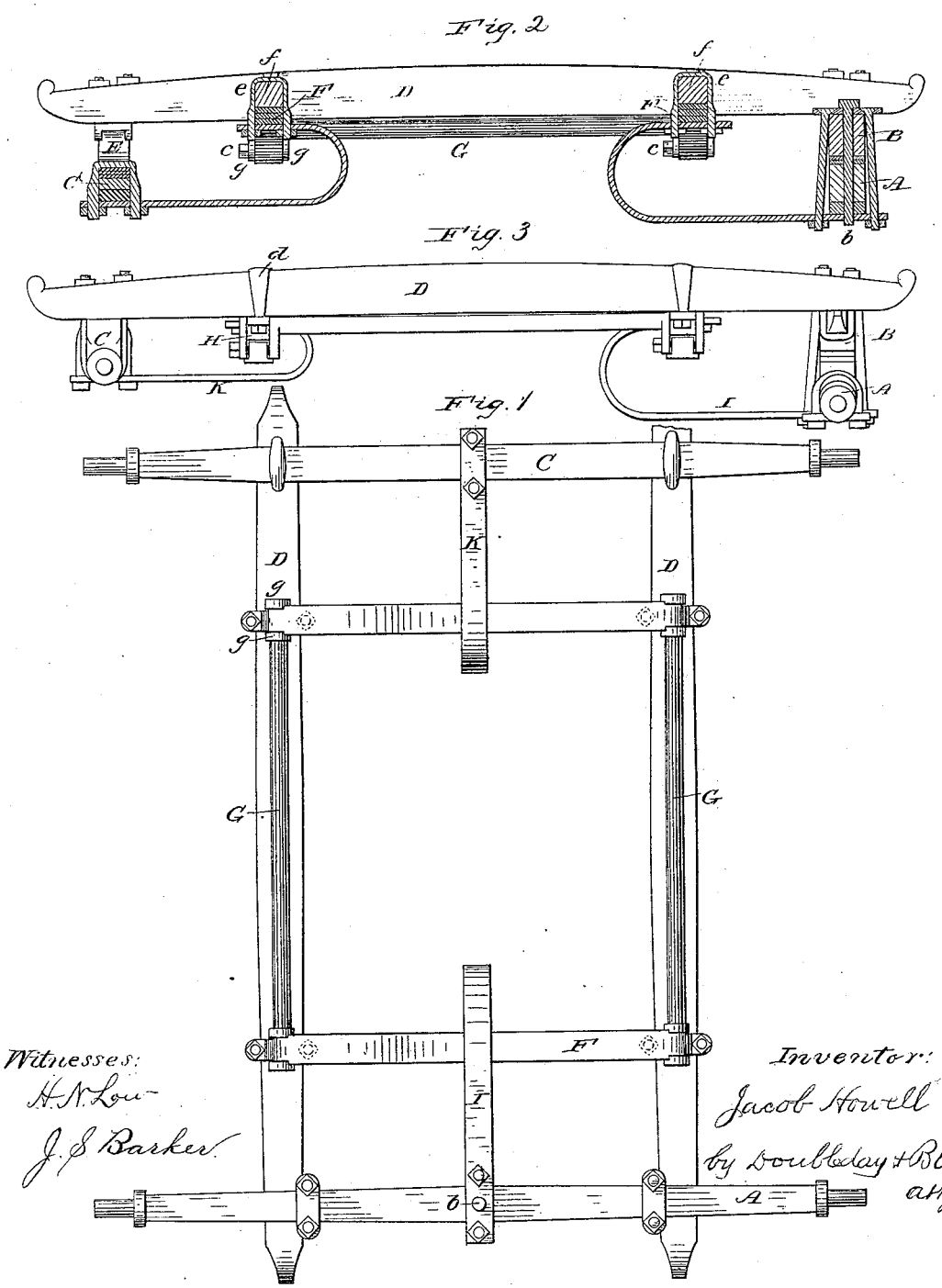
Witnesses:
H. N. Low
J. S. Barker
Inventor:
Jacob Howell
by Doubleday & Bliss
attys

UNITED STATES PATENT OFFICE.

JACOB HOWELL, OF JACKSON, MICH., ASSIGNOR OF ONE-HALF TO CHESTER WARRINER AND EUGENE J. WEEKS, BOTH OF SAME PLACE.

SIDE-BAR CARRIAGE.

SPECIFICATION forming part of Letters Patent No. 246,510, dated August 30, 1881.

Application filed June 28, 1881. (No model.)

*To all whom it may concern:*

Be it known that I, JACOB HOWELL, a citizen of the United States of America, residing at Jackson, in the county of Jackson and State of Michigan, have invented certain new and useful Improvements in Side-Bar Carriages; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a bottom-plan view. Fig. 2 is a longitudinal section. Fig. 3 is a side elevation of the frame shown in the other figures, with the exception that the side bars are rigidly connected directly to the rear axle instead of being attached to springs supported upon said axle.

A represents the front axle of the vehicle, and B the bolster, to which the axle is pivoted by the bolt $b$.

C is the rear axle, and D D are the side bars. The latter are attached to the bolster B by clips, and are connected to the rear axle either directly, as shown in Fig. 3, or by means of springs E E resting upon and projecting upwardly from the axle.

Between the bolster B and the rear axle are situated the main springs F F. They are arranged parallel to the bolster B and the axle C and at right angles to the side bars, D D. The carriage-body is supported upon these springs by pillow-blocks $f\,f$, in the ordinary manner. The springs F F extend outwardly to points beneath the side bars, D D, but are not connected directly or rigidly to said side bars. They are hinged to rocking bars G G, which are respectively located beneath and against the under side of the side bars, D D. The rocking bars G G are formed with two ears, $g\,g$, at each end, and between these ears the springs F F are fastened, by means of bolts, at $c\,c$. The rocking bars are held in place beneath the side bars by yokes or stirrups H, which are attached to the side bars by clips $d\,d$. When from any cause there is a pressure or strain exerted upon either the front or the rear spring, F, the bars G G are rocked outward and operate to transfer the strain or pressure from one spring to the other, and thus effect an equalizing of the force exerted upon the springs. Rocking bars G G are protected from all lateral or vertical strain by means of the side bars, D D, and when they are secured in place in the manner shown all cramping of the movable parts is avoided, as the rocking bars can be mounted with the greatest possible firmness.

In order to increase the spring action, I employ bent springs I K, secured respectively beneath the front and the rear axles and to the front and rear springs, F. They are bent at their inner ends into substantially a U shape, the upper arm being shorter than the lower, as shown. These supplemental springs are situated substantially on the central line of the carriage, and are secured to the springs F F by means of the clips $e\,e$, which fasten the pillow-blocks $f\,f$. The front supplemental spring, I, may be perforated to permit the passage of the bolt $b$ and allow the axle to oscillate freely.

I am aware that rocking bars, broadly considered, have been used heretofore; but I believe myself to be the first to have devised the arrangement described, whereby I am enabled to avoid many of the objectionable features incident to the constructions heretofore employed in which use was made of such bars. When arranged and combined in the manner I have shown and described, a firmer support and bearing are provided and the front and the rear of the frame are left free, so that supplemental springs similar to those shown at I and K may be combined with the main springs and the other parts.

By mounting the bars G G in the open yokes or stirrups H they can be readily attached to or removed from the side bars.

What I claim is—

In a side-bar carriage, the combination, with the axle C, bolster B, side bars, D D, rigidly connected to said bolster and connected to said axle, and the transverse springs F F, parallel to said axle and bolster, of the rocking and equalizing bars G G, when situated directly against the under side of the side bars, D D, the clips $d\,d$, and stirrups H for mounting the rocking bars G, as set forth.

In testimony whereof I affix my signature in presence of two witnesses.

JACOB HOWELL.

Witnesses:
 EUGENE J. WEEKS,
 FRED KING.